(12) United States Patent
Poo et al.

(10) Patent No.: US 7,549,161 B2
(45) Date of Patent: *Jun. 16, 2009

(54) PORTABLE DEVICE HAVING BIOMETRICS-BASED AUTHENTICATION CAPABILITIES

(75) Inventors: Teng Pin Poo, Singapore (SG); Lay Chuan Lim, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 435 days.

This patent is subject to a terminal disclaimer.

(21) Appl. No.: 09/898,310

(22) Filed: Jul. 3, 2001

(65) Prior Publication Data

US 2003/0005336 A1 Jan. 2, 2003

(30) Foreign Application Priority Data

Jun. 28, 2001 (WO) ............... PCT/SG01/00135

(51) Int. Cl.
*G06F 7/04* (2006.01)

(52) U.S. Cl. ............... 726/5; 726/17; 726/28; 713/172; 713/186; 713/193

(58) Field of Classification Search ........... 713/186, 713/202, 201, 189; 726/5
See application file for complete search history.

(56) References Cited

U.S. PATENT DOCUMENTS

| | | | |
|---|---|---|---|
| 4,853,523 A | 8/1989 | Talmadge | |
| 4,988,855 A | 1/1991 | Iijima | |
| 5,282,247 A | 1/1994 | McLean et al. | |
| 5,291,584 A | 3/1994 | Challa et al. | |
| 5,297,148 A | 3/1994 | Harari et al. | |
| 5,375,243 A | 12/1994 | Parzych et al. | |

(Continued)

FOREIGN PATENT DOCUMENTS

CA 2334113 4/1999

(Continued)

OTHER PUBLICATIONS

Aladdin Knowledge Systems, Inc.; MacHUSP USB; (advertising material); pp. 29-38.

(Continued)

*Primary Examiner*—Emmanuel L Moise
*Assistant Examiner*—Shewaye Gelagay
(74) *Attorney, Agent, or Firm*—White & Case LLP

(57) ABSTRACT

Apparatus and method for implementing biometrics-based access control to a restricted resource. In a preferred embodiment, the present invention is realized using a portable device. Specifically, in one embodiment, the portable device includes a microprocessor, a non-volatile memory coupled thereto, and a biometrics-based authentication module controlled by the microprocessor. Preferably, the biometrics technology used is fingerprint authentication technology. The authentication module is capable of registering a fingerprint upon first use of the portable device, storing an encoded version of the fingerprint in the non-volatile memory. Subsequently, the authentication module can read a person's fingerprint and reliably determine whether the fingerprint matches the registered fingerprint stored in the non-volatile memory. If a match is found, access to the restricted resource is granted to that person; otherwise, access is denied. Embodiments of the present invention thus provide a highly convenient, secured and reliable method and system for user authentication and access control which was not achievable in prior art password-based authentication approaches.

3 Claims, 7 Drawing Sheets

U.S. PATENT DOCUMENTS

| | | | |
|---|---|---|---|
| 5,414,425 A | 5/1995 | Whiting et al. | |
| 5,442,704 A | 8/1995 | Holtey | |
| 5,469,564 A | 11/1995 | Junya | |
| 5,485,519 A | 1/1996 | Weiss | |
| 5,490,096 A | 2/1996 | Seto | |
| 5,517,014 A | 5/1996 | Iijima | |
| 5,583,538 A | 12/1996 | Watanabe et al. | |
| 5,588,146 A | 12/1996 | Leroux | |
| 5,621,798 A | 4/1997 | Aucsmith | |
| 5,646,646 A | 7/1997 | Inoue et al. | |
| 5,655,077 A | 8/1997 | Jones et al. | |
| 5,659,705 A | 8/1997 | McNutt et al. | |
| 5,663,901 A | 9/1997 | Wallace et al. | |
| 5,684,742 A | 11/1997 | Bublitz et al. | |
| 5,760,986 A | 6/1998 | Morehouse et al. | |
| 5,815,252 A * | 9/1998 | Price-Francis | 356/71 |
| 5,815,426 A | 9/1998 | Jigour et al. | |
| 5,844,986 A | 12/1998 | Davis | |
| 5,850,189 A | 12/1998 | Sakanaka et al. | |
| 5,867,802 A | 2/1999 | Borza | |
| 5,890,016 A | 3/1999 | Tso | |
| 5,920,640 A | 7/1999 | Salatino et al. | |
| 5,928,347 A | 7/1999 | Jones | |
| 5,935,244 A | 8/1999 | Swamy et al. | |
| 5,938,750 A | 8/1999 | Shaberman | |
| 5,943,603 A | 8/1999 | Parulski et al. | |
| 5,949,882 A | 9/1999 | Angelo | |
| 5,969,750 A | 10/1999 | Hsieh et al. | |
| 5,978,833 A | 11/1999 | Pashley et al. | |
| 6,003,135 A | 12/1999 | Bialick et al. | |
| 6,005,613 A | 12/1999 | Endsley et al. | |
| 6,011,486 A | 1/2000 | Casey | |
| 6,011,741 A | 1/2000 | Wallace et al. | |
| 6,012,103 A | 1/2000 | Sartore et al. | |
| 6,016,476 A | 1/2000 | Maes et al. | |
| 6,016,530 A | 1/2000 | Auclair et al. | |
| 6,016,553 A | 1/2000 | Schneider et al. | |
| 6,027,375 A | 2/2000 | Wu | |
| 6,038,320 A | 3/2000 | Miller | |
| 6,038,640 A | 3/2000 | Terme | |
| 6,044,428 A | 3/2000 | Rayabhari | |
| 6,047,376 A | 4/2000 | Hosoe et al. | |
| 6,058,441 A | 5/2000 | Shu | |
| 6,061,799 A | 5/2000 | Eldridge et al. | |
| 6,067,625 A | 5/2000 | Ryu | |
| 6,087,955 A | 7/2000 | Gray | |
| 6,088,755 A | 7/2000 | Kobayashi et al. | |
| 6,088,802 A * | 7/2000 | Bialick et al. | 713/200 |
| 6,105,130 A | 8/2000 | Wu et al. | |
| 6,116,006 A | 9/2000 | Killen et al. | |
| 6,131,141 A | 10/2000 | Ravid | |
| 6,145,045 A | 11/2000 | Falik et al. | |
| 6,145,046 A | 11/2000 | Jones | |
| 6,145,069 A | 11/2000 | Dye et al. | |
| 6,148,354 A | 11/2000 | Ban et al. | |
| 6,151,069 A | 11/2000 | Dunton et al. | |
| 6,151,657 A | 11/2000 | Sun et al. | |
| 6,178,508 B1 | 1/2001 | Kaufman et al. | |
| 6,182,162 B1 * | 1/2001 | Estakhri et al. | 710/11 |
| 6,199,122 B1 | 3/2001 | Kobayashi | |
| 6,219,439 B1 * | 4/2001 | Burger | 382/115 |
| 6,286,087 B1 | 9/2001 | Ito et al. | |
| 6,300,976 B1 | 10/2001 | Fukuoka | |
| 6,304,898 B1 | 10/2001 | Shiigi | |
| 6,324,537 B1 * | 11/2001 | Moran | 707/9 |
| 6,330,624 B1 | 12/2001 | Cromer et al. | |
| 6,330,648 B1 | 12/2001 | Wambach et al. | |
| 6,351,093 B1 | 2/2002 | Kato et al. | |
| 6,351,810 B2 | 2/2002 | Gupta | |
| 6,361,369 B1 | 3/2002 | Kondo et al. | |
| 6,370,603 B1 | 4/2002 | Silverman et al. | |
| 6,371,376 B1 | 4/2002 | Dan | |
| 6,385,667 B1 * | 5/2002 | Estakhri et al. | 710/8 |
| 6,385,677 B1 | 5/2002 | Yao | |
| 6,446,118 B1 | 9/2002 | Gottlieb | |
| 6,457,099 B1 | 9/2002 | Gilbert | |
| 6,477,206 B1 | 11/2002 | Chatani | |
| 6,490,163 B1 | 12/2002 | Pua et al. | |
| 6,577,337 B1 | 6/2003 | Kang | |
| 6,618,806 B1 * | 9/2003 | Brown et al. | 713/186 |
| 6,618,807 B1 | 9/2003 | Wang et al. | |
| 6,628,325 B1 | 9/2003 | Steinberg et al. | |
| 6,636,973 B1 * | 10/2003 | Novoa et al. | 713/202 |
| 6,671,808 B1 * | 12/2003 | Abbott et al. | 726/4 |
| 6,725,382 B1 | 4/2004 | Thompson et al. | |
| 6,732,278 B2 * | 5/2004 | Baird et al. | 713/201 |
| 6,748,541 B1 * | 6/2004 | Margalit et al. | 726/9 |
| 6,753,921 B1 | 6/2004 | Shimizu | |
| 6,763,399 B2 | 7/2004 | Margalit et al. | |
| 6,766,456 B1 * | 7/2004 | McKeeth | 713/200 |
| 6,799,275 B1 * | 9/2004 | Bjorn | 713/186 |
| 6,829,672 B1 | 12/2004 | Deng et al. | |
| 6,848,045 B2 | 1/2005 | Long et al. | |
| 6,880,054 B2 | 4/2005 | Cheng et al. | |
| 6,970,183 B1 | 11/2005 | Monroe | |
| 6,976,075 B2 | 12/2005 | Ma | |
| 6,986,030 B2 | 1/2006 | Shumueli et al. | |
| 6,992,721 B1 | 1/2006 | Kambayashi et al. | |
| 7,036,738 B1 * | 5/2006 | Vanzini et al. | 235/486 |
| 7,039,759 B2 | 5/2006 | Chent et al. | |
| 7,111,324 B2 | 9/2006 | Elteto | |
| 2001/0004326 A1 * | 6/2001 | Terasaki | 365/185.23 |
| 2001/0009439 A1 | 7/2001 | Hwang | |
| 2001/0016845 A1 | 8/2001 | Tribbensee | |
| 2001/0029583 A1 | 10/2001 | Palatov et al. | |
| 2001/0030827 A1 | 10/2001 | Morohashi | |
| 2001/0045458 A1 * | 11/2001 | Polansky | 235/382 |
| 2001/0047441 A1 | 11/2001 | Robertson | |
| 2001/0048409 A1 | 12/2001 | Kim | |
| 2001/0052541 A1 * | 12/2001 | Kang et al. | 235/379 |
| 2002/0010857 A1 | 1/2002 | Karthik et al. | |
| 2002/0029343 A1 | 3/2002 | Kurita et al. | |
| 2002/0065083 A1 | 5/2002 | Patel | |
| 2002/0069237 A1 | 6/2002 | Ehara | |
| 2002/0073234 A1 | 6/2002 | Ma | |
| 2002/0106933 A1 | 8/2002 | Lee | |
| 2002/0107046 A1 | 8/2002 | Davis | |
| 2002/0116565 A1 | 8/2002 | Wang et al. | |
| 2002/0131397 A1 | 9/2002 | Patel et al. | |
| 2002/0145507 A1 * | 10/2002 | Foster | 340/5.53 |
| 2002/0147882 A1 | 10/2002 | Pua et al. | |
| 2002/0151216 A1 | 10/2002 | Wei | |
| 2002/0152391 A1 * | 10/2002 | Willins et al. | 713/186 |
| 2002/0167546 A1 | 11/2002 | Kimbell et al. | |
| 2002/0174287 A1 | 11/2002 | Cheng | |
| 2002/0174348 A1 | 11/2002 | Ting | |
| 2002/0194414 A1 | 12/2002 | Bateman et al. | |
| 2003/0063196 A1 | 4/2003 | Palatov et al. | |
| 2003/0103369 A1 | 6/2003 | Wu | |
| 2003/0110371 A1 | 6/2003 | Yang et al. | |
| 2003/0115415 A1 | 6/2003 | Want et al. | |
| 2003/0122839 A1 | 7/2003 | Matrazek et al. | |
| 2003/0157959 A1 | 8/2003 | Makela et al. | |
| 2003/0163634 A1 | 8/2003 | Kim | |
| 2004/0025031 A1 | 2/2004 | Ooi et al. | |
| 2004/0049589 A1 | 3/2004 | Papanikolaou et al. | |
| 2004/0098598 A1 | 5/2004 | Wolfram | |
| 2004/0179588 A1 | 9/2004 | Kuffner et al. | |
| 2004/0236980 A1 | 11/2004 | Chen | |

| | | | | | |
|---|---|---|---|---|---|
| 2005/0235148 A1 | 10/2005 | Scheidt et al. | JP | 2005-167965 | 6/2005 |
| 2006/0230202 A1 | 10/2006 | Lee | JP | 2006-030326 | 2/2006 |
| | | | KR | 1999-0018244 A | 3/1999 |

FOREIGN PATENT DOCUMENTS

| | | |
|---|---|---|
| CN | 1291750 A | 4/2001 |
| CN | 99117225.6 | 4/2001 |
| DE | 37 06 466 A | 9/1988 |
| DE | 195 36 206 A1 | 4/1996 |
| DE | 196 45 937 A1 | 5/1998 |
| DE | 197 12 053 A1 | 9/1998 |
| DE | 100 57697 A1 | 5/2002 |
| EP | 0 152 024 B1 | 8/1985 |
| EP | 0 703 544 A | 3/1996 |
| EP | 0 856 818 A2 | 5/1998 |
| EP | 0 856 818 A3 | 5/1998 |
| EP | 0 883 083 A1 | 9/1998 |
| EP | 0 883 084 A2 | 12/1998 |
| EP | 0 923 018 A2 | 6/1999 |
| EP | 0 924 656 A2 | 6/1999 |
| EP | 0 924 657 A2 | 6/1999 |
| EP | 0 929 043 A1 | 7/1999 |
| EP | 0945777 A3 | 9/1999 |
| EP | 1 030 494 A1 | 8/2000 |
| EP | 1 077 399 A2 | 2/2001 |
| EP | 1 085 521 A1 | 3/2001 |
| EP | 1 100 000 A2 | 5/2001 |
| EP | 0 912 939 B1 | 9/2001 |
| EP | 1 146 559 A1 | 10/2001 |
| EP | 1139224 A2 | 10/2001 |
| EP | 1 152 324 A2 | 11/2001 |
| EP | 1 156 697 A1 | 11/2001 |
| EP | 1 215 876 A1 | 6/2002 |
| EP | 1 215 877 A2 | 6/2002 |
| EP | 1 215 877 A3 | 6/2002 |
| EP | 0 674 290 B1 | 1/2004 |
| EP | 1 146 559 B1 | 3/2006 |
| GB | 2 197 734 A | 5/1988 |
| GB | 2 204 971 A | 11/1988 |
| GB | 2 312 040 A | 10/1997 |
| GB | 2 361 558 A | 10/2001 |
| JP | 08-263631 | 10/1996 |
| JP | 9069067 | 3/1997 |
| JP | 10-283292 A | 10/1998 |
| JP | 11-053060 A | 2/1999 |
| JP | 11-143760 | 5/1999 |
| JP | 11-184992 | 7/1999 |
| JP | 11-265324 A | 9/1999 |
| JP | 11266384 A | 9/1999 |
| JP | 2000 048177 | 2/2000 |
| JP | 2000-181963 A | 6/2000 |
| JP | 2000 200123 | 7/2000 |
| JP | 2000 200248 | 7/2000 |
| JP | 2000 209534 A | 7/2000 |
| JP | 2000 307911 | 11/2000 |
| JP | 2000-331166 | 11/2000 |
| JP | 2000-350174 | 12/2000 |
| JP | 2001-059701 | 3/2001 |
| JP | 2001-069260 A | 3/2001 |
| JP | 2001-069390 | 3/2001 |
| JP | 2001-118046 A | 4/2001 |
| JP | 2001-128113 A | 5/2001 |
| JP | 2001 216099 | 8/2001 |
| JP | 2001 242965 A | 9/2001 |
| JP | 2001 290753 A | 10/2001 |
| JP | 2001 344173 | 12/2001 |
| JP | 2001 346075 | 12/2001 |
| JP | 2002-041247 A | 2/2002 |
| JP | 2002 157195 | 5/2002 |
| JP | 2002-222022 A | 8/2002 |
| JP | 2002 232769 A | 8/2002 |
| JP | 2002 359763 A | 12/2002 |
| JP | 2003 186782 A | 7/2003 |
| KR | 1999-0062951 | 7/1999 |
| KR | 1999-0062951 A | 7/1999 |
| KR | 2000-0009757 A | 2/2000 |
| KR | 10-2000-0054614 | 9/2000 |
| KR | 2000-0061817 A | 10/2000 |
| KR | 2001-0044238 A | 6/2001 |
| KR | 2001-0067730 A | 7/2001 |
| KR | 2001-0074291 A | 8/2001 |
| KR | 2001-0097886 A | 11/2001 |
| KR | 2002-0014193 A | 2/2002 |
| KR | 2002 085497 A | 11/2002 |
| NZ | 329369 | 10/1997 |
| TW | 431101 | 4/2001 |
| TW | 439377 | 6/2001 |
| TW | 446851 | 7/2001 |
| TW | 453071 | 9/2001 |
| WO | WO 87/07063 | 11/1987 |
| WO | WO 89/12287 A | 12/1989 |
| WO | WO 94/12938 A1 | 6/1994 |
| WO | WO 95/16238 A1 | 6/1995 |
| WO | WO 97/39549 A2 | 10/1997 |
| WO | WO 98/07255 | 2/1998 |
| WO | WO 98/12670 | 3/1998 |
| WO | WO 98/13791 A | 4/1998 |
| WO | WO 98/38567 | 9/1998 |
| WO | WO 99/08238 | 2/1999 |
| WO | WO 99/13434 A1 | 3/1999 |
| WO | WO 99/16024 A1 | 4/1999 |
| WO | WO 99/56429 A1 | 4/1999 |
| WO | WO 99/40723 | 8/1999 |
| WO | WO 99/45460 | 9/1999 |
| WO | WO 99/63476 | 12/1999 |
| WO | WO 00/03316 A1 | 1/2000 |
| WO | WO 00/07387 | 2/2000 |
| WO | WO 00/14987 A | 3/2000 |
| WO | WO 00/19294 A2 | 4/2000 |
| WO | WO 00/28471 | 5/2000 |
| WO | WO 00/42491 | 7/2000 |
| WO | WO 00/55707 A1 | 9/2000 |
| WO | WO 00/60476 | 10/2000 |
| WO | WO 00/67098 A1 | 11/2000 |
| WO | WO 01/08055 A1 | 2/2001 |
| WO | WO 01/09845 A1 | 2/2001 |
| WO | WO 01/16917 A2 | 3/2001 |
| WO | WO 01/22351 | 3/2001 |
| WO | WO 01/23987 | 4/2001 |
| WO | WO 01/31577 A1 | 5/2001 |
| WO | WO 01/33317 A1 | 5/2001 |
| WO | WO 01/48612 A1 | 7/2001 |
| WO | WO 01/61692 A | 8/2001 |
| WO | WO 01/73570 A | 10/2001 |
| WO | WO 01/86640 A | 11/2001 |

OTHER PUBLICATIONS

Rogers, Sue; Techlink Seminar 3 New Mac Hardware and Peripherals; Nov. 19, 1999.

Universal Serial Bus Mass Storage Class Specification Overview; V 1.0 Revision; Oct. 22, 1998.

Universal Serial Bus Mass Storage Class / UFI Command Specification; Revision 1.0; Dec. 14, 1998.

Ziller, Jason and Fair, David; Which External I/O Bus Is Right For You?; Intel Corporation; Intel Developer Update Magazine; Jan. 2000.

U.S. Appl. No. 09/449,159, Abbott et al.

Aladdin eToken and Rainbow iKey; Rainbow; date unknown.

Lexar JumpShot Cable; date unknown.

PCMCIA SRAM & Linear Flash Cards; C1-Tech, Simple Technology, Centennial, Intel, KingMax; date unknown; retrieved from the internet URL:http://www.psism.com/sram.htm ; 5 pages.

Pretec PCMCIA Type I SRAM 2048 KB; date unknown; retrieved from the internet URL:http://www.everythinglinux.com.../SRAM2M?elinux=e0c72135e544a6ea13772f5c23ba3f0 ; 1 page.
What is Memory Stick?; date unknown; retrieved from the internet URL:http://www.memorystick.org/topic/eng/aboutms/feat_outline.html ; 1 page.
Rajesh Gupta; Yervant Zorian; Introducing Core-Based System Design; IEEE; 1997; pp. 15-25.
CY7C63000, CY7C63001, CY7C63100, CY7C63101, CY7C63200, CY7C63201 Universal Serial Bus Microcontroller; Cypress; Jun. 26, 1997; 27 pages.
PC/104 PCMCIA Module, 1st Edition, Part No. 2007311000 Manual; Printed in Taiwan; Jul. 1997.
IBM Smart Card Solution Elements; IBM; Jul. 1997; pp. 1-24.
Interfacing the Intel Flash 28F001BX-T to Your 186 Based System; Intel; 1998; retrieved from the internet URL:http://developer.intel.com/design/intarch/applnots/2150.htm 14 pages.
SY-6IEB Main Board Quick Start Guide; SOYO Computer Inc.; Sep. 1998; pp. 3-14.
Universal Serial Bus Specification Revision 1.1; Compaq, Intel, Microsoft, NEC; Sep. 23, 1998.
Week of Oct. 19, 1998; Multimedia Work; Oct. 23, 1998; retrieved from internet URL:http://www.m2w.net/News/981019.html ; 10 pages.
Understanding the Flash Translation Layer (FTL) Specification; Intel; Dec. 1998.
SanDisk ImageMate USB Review ; Digital Eyes; copyright 1998-2001; retrieved from internet URL:http://www.image-acquire.com/articles/storage/sdimagematesub.shtml ; 2 pages.
USBDrive Professional; www.usbdrive.com, 1998-2003.
Tony K.P. Wong; An Embedded Chip for USB Application: from the Architecture to Implementation; International IC'99 Conference Proceedings; Siemens; 1999; 10 pages.
AlphaPC 164LX Motherboard Product Brief; Alphaprocessor, Inc.; Jan. 1999; 2 pages.
Image Memory Card Reader SM-R1 Owner's Manual; FujiFilm; Apr. 1, 1999.
SanDisk ImageMate USB CF Card Reader; Feather River Canyon News; Jul. 12, 1999; retrieved from the internet URL:http://www.quicknet.com/~frcn/SanDiskUSB.html ; 3 pages.
Jeff Keller; DCRP Review: Fujifilm MX-2900; Digital Camera Resource Page; Jul. 27, 1999; retrieved from the internet URL:http://www.dcresource.com/reviews/fuji/mx2900-review/ ; 9 pages.
Matsushita Electric, Scandisk and Toshiba Agree Join Forces to Develop and Promote Next Generation Secure Memory Card; SD Card Association; Aug. 25, 1999; retrieved from internet URL:http://www.sdcard.org/press5.htm; 4 pages.
(BW) (CA—Rainbow—Technologies) (RNBO) Rainbow Technologies Forms New Joint Venture in China; Business Wire; Nov. 8, 1999; Retrieved from the internet URL:http://www.businesswire.com/webbox/bw.110899/193120188.htm ; 2 pages.
Fuji Film SM-R1 Memory Card Reader; TwoMobile; Dec. 1999; retrieved from internet URL:http://www.twomobile.com/rev_smr1reader.html ; 3 pages.
Trek's Thumb Drive Debuts at CeBit; The Business Times; Feb. 28, 2000.
Boot sequence [online]; Jan. 16, 2001; retrieved from the internet: URL:http://web.archive.org/web/20010116104400/www.pcguide.com/ref/mbsys/bios/set/adv_Boot.htm.

T. Fukagawa and M. Nagayama, "2001 edition of Hints on Use of PC—Release of Convincing Techniques and Useful Approaches to Using PC," *Touch PC*, Mainichi Communications, Inc., Mar. 24, 2001, vol. 6, No. 3, pp. 20-21.
SL11R USB Controller/16-Bit RISC Processor Data Sheet; Cypress Semiconductor Corporation; Dec. 3, 2001; 85 pages.
USB Support for Amibios8 [online]; American Megatrends; Oct. 16, 2002; retrieved from the internet: URL:http://www.ami.com/support/downloaddoc.cfm?DLFile=support/doc/AMIBIOS8_USB_Whitepaper.pdf&FileID=513 ; 12 pages.
SSFDC Forum; SSFDC Forum; Dec. 27, 2002; retrieved from internet URL:http://www.ssfdc.or.jp/english/ ; 1 page.
Mainboard D1307. Datasheet [online]; Fujitsu Siemens Computer, Mar. 2003; retrieved from the internet: URL:www.fujitsu-siemens.com.pl/_itemserver/dok_mainboard/datasheet_d1307.pdf ; 2 pages.
Concept of SPB-Linux-2 [online]; Mar. 24, 2003; retrieved from the internet: URL:http:web.archive.org/web/20030324012428/http://www.8ung.at/spblinux/concept.htm ; 3 pages.
Reference Design: SL11RIDE-Combo; Cypress; Jul. 10, 2003; retrieved from internet; 2 pages.
Availability of Universal Serial Bus Support in Windows 95; Oct. 7, 2003; retrieved from the internet URL:http://support.microsoft.com/default.aspx?scid=kb;en-us:253756 ; 3 pages.
Aladdin Announces eToken "Next Generation Security Key Based on Universal Bus Port" San Jose, RSA Data Security Conference, Alladin Booth#238, Jan. 19, 1999 ,<Web document retrieved at http://www.aladdin.com/news/1999/etoken/etoken.asp>.
PocoMail PE v.2.63, Web Site Publication, Web Site states released Feb. 2002, http://poco.ca/press.html.
"A Widget Makes a Bright Debut," article in "Shenzhen Special Zone Daily," Oct. 9, 1999.
"JBMail" article, PC Tip Magazine, Switzerland. Dec. 2001.
"WIBU-Key User's Guide for Windows, DOS, OS/2 and MacOS on IBM compatible PCs and Macintosh Version 2.5", pp. 11 to 16 and 25 to 27, Published Jul. 1998.
Affidavit of Cheng Xiaohua of Netac Technology Co. Ltd., China; submitted to the High Court of the Republic of Singapore in Suit No. S672/2002/S; Jun. 3, 2003.
Claims filed by the applicant of EP 1234305 on Oct. 10, 2006.
Decision by the EPO to refuse EP publication No. 1234305 dated Feb. 1, 2007.
Decision issued by The UK Patent Office in Application under Section 72 for revocation of patent No. GB 2371653 dated Nov. 8, 2006.
Grounds of Decision issued in Civil Appeals Nos. 69 and 70 of 2005 in the Court of Appeals of the Republic of Singapore, Dec. 30, 2005.
Minutes of Oral Proceedings held in EPO on Nov. 9, 2006 for EP Publication No. 1 234 305 issued on Feb. 1, 2007.
Shenzhen Net AC Technology Co., Ltd publication "Very Small" floppy disk-Only Disk, Oct. 4, 1999.
Statutory Declaration of Cheng Xiaohua of Netac Technology Co. Ltd., China; executed under oath in Singapore; Sep. 8, 2003.
Toshiba: Press Release Nov. 12, 2001 "Toshiba and Sandisk Introduce a One Gigabit NAND Flash Memory Chip, Doubling Capacity of Future Flash Products," pp. 1-3, Published Nov. 12, 2001.
Toshiba: Press Release Sep. 26, 2000 "Toshiba Introduces 512M bit and 1G bit NAND Flash Memories," pp. 1-2, Published Sep. 26, 2000.

* cited by examiner

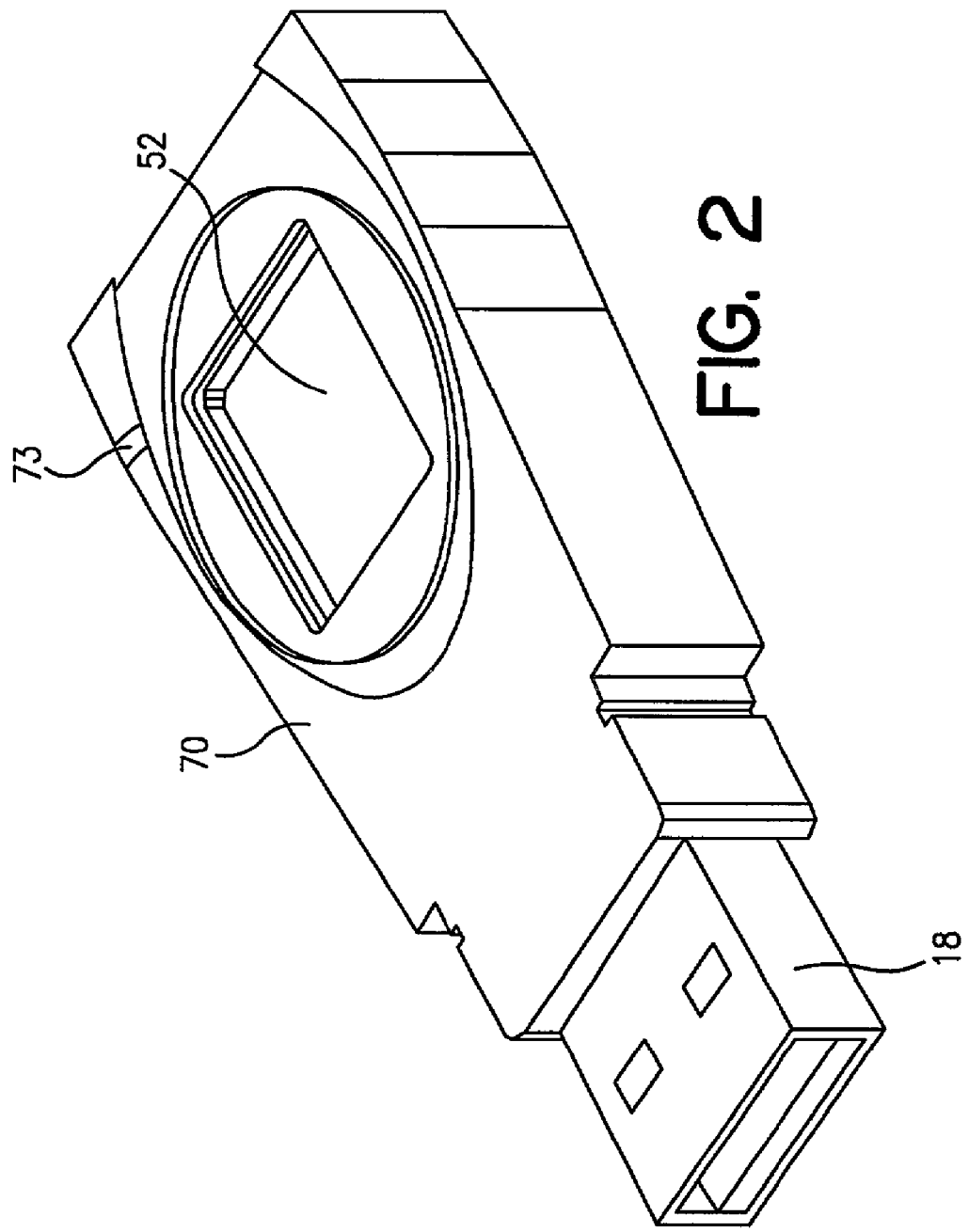

PORTABLE DEVICE HAVING BIOMETRICS-BASED AUTHENTICATION CAPABILITIES

This application claims the benefit of PCT Application No. PCT/SG01/00135 filed on Jun. 28, 2001, the subject matter of which is hereby incorporated by reference in its entirety.

FIELD OF THE INVENTION

The present invention relates to a portable device, and in particular, a portable data storage and access control device having biometrics-based authentication capabilities.

DESCRIPTION OF THE RELATED ART

Portable data storage devices have become a class of indispensable peripherals that are widely utilized in business, educational and home computing. These devices are generally not permanently fitted to a particular host platform, such as a personal computer (PC). Rather, they can be conveniently removed from and attached to any computer having the appropriate connection port (e.g., a serial bus port like a USB port, an IEEE 1394 ("Firewire") port). Thus, these portable data storage devices enable a user to transfer data among different computers that are not otherwise connected. A popular type of portable storage device utilizes a non-volatile solid-state memory (e.g., flash memory) as the storage medium and so does not require moving parts or a mechanical drive mechanism for accessing the data. The absence of a drive mechanism enables these portable solid-state memory devices to be more compact than surface storage devices such as magnetic disks and CD-ROMs.

As portable storage devices become more widely used in various institutional and personal computing environments, preventing unauthorized users from accessing information stored on a portable or designated storage media is one of the most significant challenges in information technology today. For example, to secure confidential business information, personal information like medical and financial or other types of sensitive data, it is essential to have a reliable security measure that is simple to use, convenient and provides a level of protection appropriate for the type of information to be secured.

To date, most portable storage devices have resorted to user passwords as a security measure for protecting against unauthorized data access. While the use of passwords as an authentication mechanism provides some level of protection against unauthorized access, it is often regarded by users as cumbersome and inconvenient due to the need to remember the password and to key it in every time the user requests access. In many systems, a user is also required to periodically change his/her password as an added level of security. This further adds to the inconvenience. Moreover, since a typical user generally needs access to several computer systems and/or networks requiring access control, the user may have to memorize numerous different passwords because they are not necessarily identical on the different systems. Thus, it would be advantageous to provide a reliable authentication mechanism for preventing unauthorized access to information stored on a portable or designated storage media that is not cumbersome or inconvenient for the user.

In addition, passwords are not unique among different users and are also subject to hacking by many skilled hackers. Once a password has been compromised, whether by inadvertent disclosure by a bona fide user to an unauthorized party or by malicious hacking, confidential data that is supposed to be password-protected are no longer guarded. Indeed, unauthorized access to such information may go unnoticed for extended periods of time. Ongoing intrusions usually remains undeterred until the victimized user finally realizes that the data has been accessed and/or destroyed, or until the system administrator detects a pattern of suspicious activities. Therefore, it would also be advantageous to provide a secured access control mechanism for protection against unauthorized access to data stored in portable storage media and various computer systems which is not easily compromised by hacking and preferably provides a unique "access key" for each individual user.

SUMMARY OF THE INVENTION

Accordingly, the present invention provides a method and system which delivers a highly reliable and user-friendly authentication mechanism for preventing unauthorized access to information stored on a portable or designated storage media. Furthermore, embodiments of the present invention also provide a highly secure access control mechanism for protection against unauthorized access to stored data and computer resources as well as guarding against unauthorized entry to premises. Aspects of the present invention, which utilizes a unique biometrics marker as a basis for identity authentication and as an "access key" for each individual user, are described in detail herein.

Specifically, a preferred embodiment of the present invention provides a portable device which includes a microprocessor, a non-volatile memory coupled thereto, and a biometrics-based authentication module controlled by the microprocessor. Preferably, the biometrics technology used is fingerprint authentication technology, and flash memory is used as the non-volatile memory. In this embodiment, the fingerprint authentication module automatically prompts the user to register his/her fingerprint with the portable device upon its first use. In a currently preferred embodiment, a compact and encrypted version of the fingerprint is stored in the portable device's flash memory when the registration process is completed. Upon a subsequent use, the fingerprint authentication module reads the user's fingerprint, compares it with the registered fingerprint stored in the flash memory and reliably determines whether there is a match between the two. If a match is identified, authentication of the user's identity is successful, and the authenticated user is granted access to the restricted resource, the access to which is being safeguarded using the present access control system. On the other hand, if a match cannot be found between the user's fingerprint and the registered fingerprint, access to the restricted resource is denied. As such, this embodiment of the present invention delivers a highly convenient, secured and reliable system for user authentication and access control which is superior to password-based authentication approaches in prior art. The present invention appreciates that fingerprints, being unique signatures for an individual, have been legally and universally accepted for verifying identity for over a century, that they cannot be forgotten by a user, as passwords could, and further that they are almost impossible to alter, duplicate, or crack by hacking. As such, fingerprints and other biometrics-based techniques are well-suited for use as an authentication and/or access control solution, as embodied in the present invention.

Advantages of the invention will be set forth, in part, in the description that follows and, in part, will be understood by those skilled in the art from the description herein.

BRIEF DESCRIPTION OF THE DRAWINGS

The accompanying drawings, which are incorporated in and constitute a part of this specification, illustrate several embodiments of the invention and, together with the description, serves to explain the principles of the invention.

FIG. 2 is a front perspective view of a portable device with an integrated fingerprint module in accordance with one embodiment of the present invention.

DETAILED DESCRIPTION OF PREFERRED EMBODIMENTS

The present invention now will be described more fully with reference to the accompanying drawings, in which preferred embodiments of the invention are shown. The present invention may, however, be embodied in many different forms and should not be construed as being limited to the embodiments set forth herein; rather these embodiments are provided so that this disclosure will be thorough and complete and will fully convey the invention to those skilled in the art. Indeed, the invention is intended to cover alternatives, modifications and equivalents of these embodiments, which will be included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details. In other instances, well known methods, procedures, components, and circuits have not been described in detail as not to unnecessarily obscure aspects of the present invention.

Figure 1A:
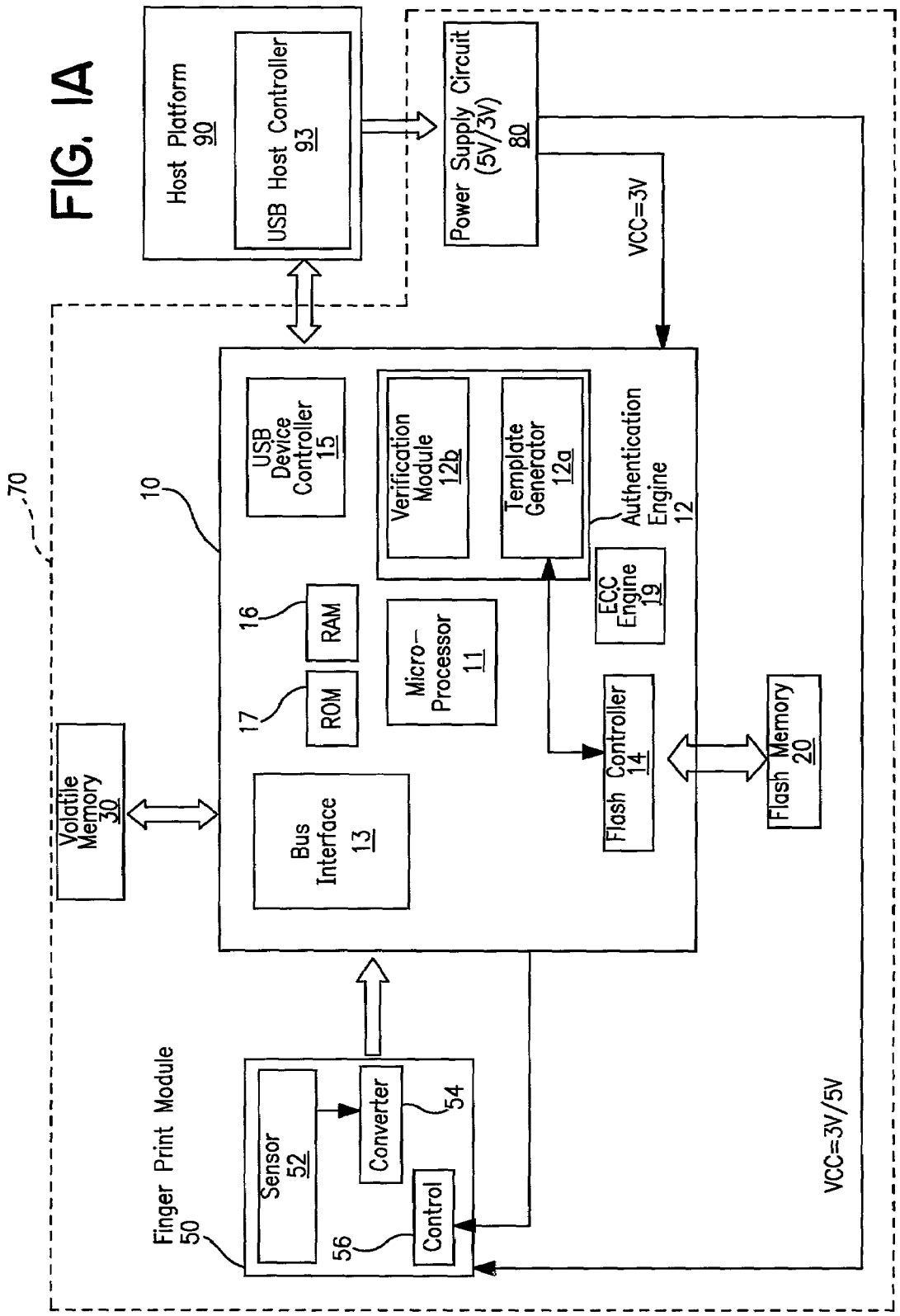
FIG. 1A is a block diagram illustrating functional blocks of one embodiment of the portable device of the present invention and an illustrative operational configuration thereof

FIG. 1A is a block diagram illustrating functional blocks of one embodiment of the portable device of the present invention and an illustrative operational configuration thereof FIG. 1A shows a portable device 70 coupled to a host platform 90. In this embodiment, host platform 90 is coupled to a power supply circuit 80 located in portable device 70. Power supply circuit 80 draws power from host platform 90 and serves as a power source for various components of portable device 70.

Referring still to FIG. 1A, portable device 70 further includes an integrated circuit 10, a flash memory 20, a volatile memory 30 and a fingerprint module 50. Integrated circuit 10 can be conveniently implemented as an application-specific integrated circuit (ASIC). In a currently preferred embodiment, flash memory 20 can have a storage capacity between 8 MB and 512 MB, a portion of which can be used to store one or more templates generated in accordance with the present invention as described below. Moreover, in a preferred embodiment, the template(s) are stored in a reserved area of flash memory 20 which is specifically designated for this purpose and which is not otherwise accessible to the user. Additionally, as described in detail further below, a template is encrypted before it is stored in flash memory 20 in a currently preferred embodiment, thereby providing added security against hacking. In one embodiment, volatile memory 30 is external to integrated circuit 10 and can comprise either a dynamic random access memory (DRAM) or a static random access memory (SRAM). Among other uses, volatile memory 30 can serve as an initial storage and staging area for a fingerprint image captured in accordance with the present invention.

Integrated circuit 10 comprises a microprocessor 11 which, in one embodiment, is a RISC processor. In a currently preferred embodiment, an authentication engine 12 is included in integrated circuit 10. Authentication engine 12 in turns comprises a template generator 12a and a verification module 12b. Template generator 12a is used to generate an encoded version of an image of a fingerprint. Within the scope of the present invention, such an encoded fingerprint image is referred to as a template. It should be appreciated that according to current biometrics technology, a fingerprint can be uniquely identified using between 8 and 13 distinct points in the raw image of the fingerprint. Fingerprint information can thus be conveniently stored in a condensed fashion as data pertaining to the 8 to 13 relevant data points. A preferred embodiment of the present invention advantageously stores a fingerprint in a compact format as a template referred to above. In this embodiment, a template has a size of 512 bytes. Other embodiments can use templates of different sizes. The other component of authentication engine 12, verification module 12b, is used to compare a newly generated template against a stored template to validate the authenticity of a fingerprint provided by someone purporting to be an authorized user. Thus, authentication engine 12 works in conjunction with fingerprint module 50, described in greater detail below, to implement user authentication in accordance with the present invention.

It should be appreciated that authentication engine 12 is well-adapted to numerous implementations within the scope of the present invention. In one embodiment, authentication engine 12 is implemented as firmware stored in a non-volatile memory within portable device 70. In another embodiment, authentication engine 12 is implemented as part of microprocessor 11. In still another embodiment, authentication engine 12 is implemented as a processor separate from microprocessor 11. In yet another embodiment, authentication engine 12 includes the same components and serves the same functions as described herein, but is located in host platform 90 rather than in portable device 70. In other words, within the scope of the present invention, authentication engine 12 is not required to reside in portable device 70. Instead, where authentication engine 12 is to be placed is a design choice, thus affording design flexibility to suit different applications in which the present invention can be utilized.

Referring still to FIG. 1A, in a preferred embodiment, integrated circuit 10 also comprises a bus interface 13 which facilitates communication between integrated circuit 10 and other components, such as volatile memory 30. Integrated circuit 10 further includes a flash controller 14 for controlling access to flash memory 20. In one embodiment, upon the successful generation of a template during user registration, flash controller 14 communicates with template generator 12a to store the newly generated template into flash memory 20 for use in subsequent user authentication. Moreover, in a currently preferred embodiment, portable device 70 is compatible with the universal serial bus (USB) standard and includes a USB connector (not shown). In this embodiment, integrated circuit 10 also includes a USB device controller 15, which serves to control the communication between portable device 70 and host platform 90, such as a USB-compatible personal computer (PC) having a USB host controller 93 therein.

With reference still to FIG. 1A, integrated circuit 10 also includes a volatile memory 16 and a non-volatile memory 17. In a preferred embodiment, volatile memory 16 is a random access memory (RAM) that serves as a working memory for microprocessor 11 during its operation. Non-volatile memory 17 is a read-only memory (ROM) in this embodiment and can be used to store firmware that perform various functions of portable device 70. Additionally, integrated circuit 10 includes an optional error checking (ECC) engine 19 for performing various error checking tasks during the operation of portable device 70. It should be appreciated that ECC engine 19, like authentication engine 12, is well-suited to numerous implementations within the scope of the present invention. For example, ECC engine 19 can be implemented by software (e.g., firmware stored in a non-volatile memory), as part of microprocessor 11, or as a processor unit separate from microprocessor 11.

Referring again to FIG. 1A, fingerprint module 50 comprises a sensor 52 which is used to capture the fingerprint image of a finger being placed thereon. Fingerprint module 50 also comprises a converter 54, which serves to convert a captured fingerprint image into electrical signals representing the image. In a currently preferred embodiment, a fingerprint image is converted into 64 KB of data by converter 54 and sent to volatile memory 30 of portable device 70 for temporary storage. In other embodiments, converter 54 can produce image data of different sizes. Fingerprint module 50 further includes an optional control unit 56 which, in a currently preferred embodiment, is controlled via microprocessor 11 in portable device 70 and is used for checking the quality of fingerprint images captured by sensor 52 to determine whether a given image is acceptable or not. As described in more detail below, if it is determined that the quality of a captured image is unacceptable, the user will be prompted to place his/her finger on sensor 52 again so that a new image can be captured.

Figure 1B:
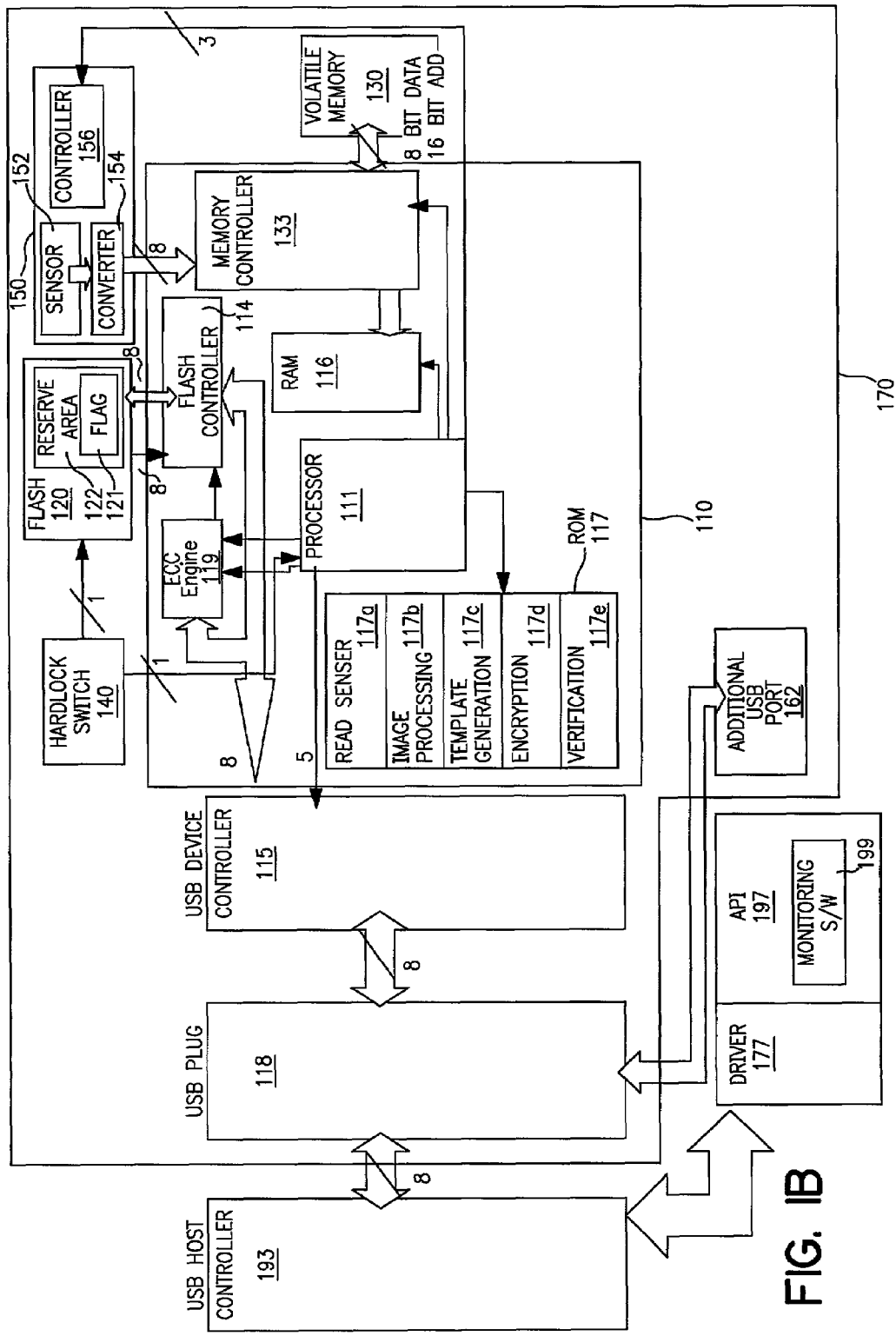
FIG. 1B is a block diagram illustrating functional blocks of another embodiment of the portable device of the present invention.

Reference is now made to FIG. 1B, which is a block diagram illustrating functional blocks of another embodiment of the portable device of the present invention. In this embodiment, portable device 170 is compatible with the USB standard and includes a USB plug 118 which, as FIG. 1B shows, is coupled to a USB host controller 193 of a host platform. Optionally, portable device 170 further includes an additional USB port 162 that is coupled to USB plug 118. USB port 162 is provided as a convenient feature that can be used to couple other USB-compatible device(s) to the USB via portable device 170. In this embodiment, portable device 170 also includes a USB device controller 115 for controlling the communication between portable device 170 and the host platform via USB host controller 193. In one embodiment, a driver software 177 and an application programming interface (API) 197, which in turn includes monitoring software 199, reside in the host platform and communicate with USB host controller 193 to facilitate the operation of portable device 170.

Portable device 170 further comprises an integrated circuit 110, a flash memory 120 and a volatile memory 130. Integrated circuit 110 can be conveniently implemented as an ASIC. In a preferred embodiment, a reserved area 122 of flash memory 120 is used to store one or more templates generated in accordance with the present invention. Furthermore, in this embodiment, reserved flash memory area 122 includes a status flag 121 which indicates whether or not portable device 170 has been previously registered in accordance with the present invention. Status flag 121 thus enables portable device 170 to automatically invoke a registration process upon its initial use, as described in detail further below. In one embodiment, volatile memory 130 comprises either a DRAM or a SRAM, which serves as an initial storage area for a fingerprint image captured in accordance with the present invention.

Referring still to FIG. 1B, integrated circuit 110 comprises a microprocessor 111 which preferably is a RISC processor. Integrated circuit 110 further includes a flash controller 114 for controlling access to flash memory 120 and a memory controller 133 for controlling access to volatile memory 130. Integrated circuit 110 also includes a volatile memory 116 and a non-volatile memory 117. Preferably, volatile memory 116 comprises a RAM for use as a working memory for microprocessor 111 during its operation, while non-volatile memory 117 comprises a ROM for storing firmware that perform various functions of portable device 170. Specifically, in one embodiment, ROM 117 stores the following firmware code: firmware 117a for reading fingerprint sensor 152, firmware 117b for processing fingerprint images, firmware 117c for generating templates, firmware 117d for encrypting fingerprint images and/or templates, and firmware 117e for verifying fingerprint authenticity. Nevertheless, it should be appreciated that in an alternative embodiment of the present invention, such firmware can be stored in a non-volatile memory within the host platform rather than in portable device 170.

Additionally, integrated circuit 110 includes an optional error checking (ECC) engine 119 for performing various error checking tasks during the operation of portable device 170. It should be appreciated that ECC engine 119 can be implemented as software (e.g., firmware) or hardware (e.g., processor/processor module) within the scope of the present invention.

Referring still to FIG. 1B, fingerprint module 150 comprises a sensor 152, a converter 154 and an optional controller 156. In this embodiment, sensor 152 is used to capture the fingerprint image of a finger being placed thereon, converter 154 serves to convert a captured fingerprint image into electrical signals representing the image, and optional controller 156 is used to check the quality of fingerprint images captured by sensor 152 to determine whether a given image is acceptable or not. It should be appreciated that such image processing capabilities can be implemented using software (e.g., firmware) or hardware (e.g., processor/processor module) within the scope of the present invention.

In a currently preferred embodiment as illustrated in FIG. 1B, microprocessor 111 controls various components of portable device 170, including flash controller 114, USB device controller 115, RAM 116, ROM 117 (and execution of firmware code stored therein), ECC engine 119, memory controller 133, and controller 156 of fingerprint module 150. In this embodiment, portable device 170 also includes a write-protection switch 140 which, when activated, triggers microprocessor 111 to disable write-access to flash memory 120.

With reference next to FIG. 2, a front perspective view of a portable device with an integrated fingerprint module in accordance with one embodiment of the present invention is shown. In FIG. 2, portable device 70 is shown with USB connector 18 protruding from its front end. Fingerprint module 50 is shown as being structurally integrated with portable device 70 in a unitary construction, with sensor 52 disposed on the top side of portable device 70. A light emitting diode (LED) 73 is also shown disposed near the edge of the top side of portable device 70. In one embodiment, LED 73 flashes when data in portable device is being accessed, thus serving as an activity indicator. In another embodiment, LED 73 lights up to indicate that an authentication process is underway.

Figure 3:
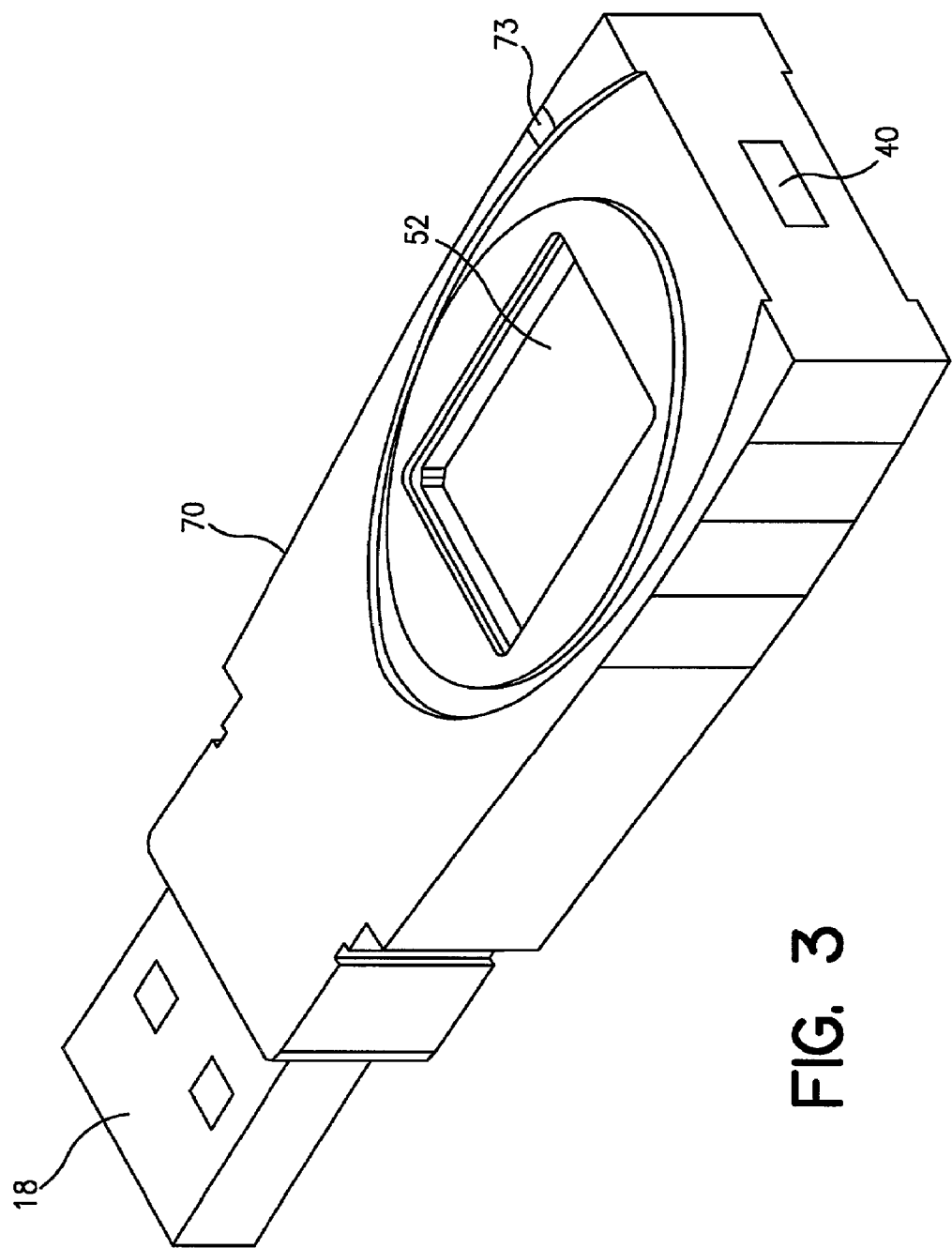
FIG. 3 is a rear perspective view of the portable device with an integrated fingerprint module as shown in FIG. 2.

Referring next to FIG. 3, a rear perspective view of the portable device with an integrated fingerprint module as depicted in FIG. 2 is shown. Again, portable device 70 is shown with USB connector 18 protruding from its front end, and fingerprint module 50 is shown as being structurally integrated with portable device 70 in a unitary construction, with sensor 52 disposed on the top side thereof LED 73 is again shown disposed near the edge of the top side of portable device 70. Optional write protection switch 40 is also shown as being located at the rear end of portable device 70.

Figure 4:
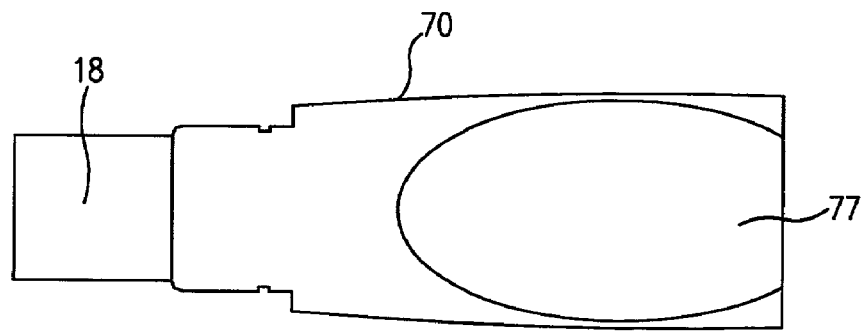
FIG. 4 is a bottom plan view of the portable device with an integrated fingerprint module as shown in FIG. 2.

Reference is now made to FIG. 4, which shows a bottom plan view of the portable device with an integrated fingerprint module as illustrated in FIG. 2. A substantially semicircular indentation 77, an optional feature which allows a user to hold portable device 70 firmly while coupling or decoupling portable device 70 to/from host platform 90 (FIG. 1A), is shown on the bottom side of portable device 70 in FIG. 4. USB connector 18 is also shown.

Figure 5:
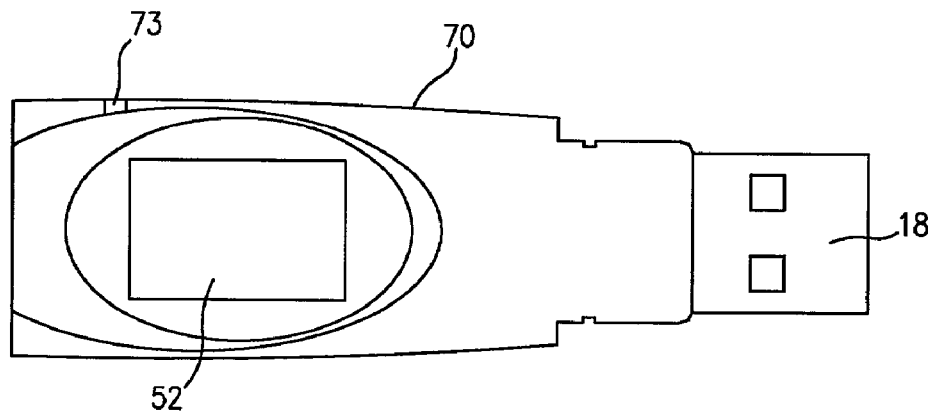
FIG. 5 is a top plan view of the portable device with an integrated fingerprint module as shown in FIG. 2.

Referring next to FIG. 5, a top plan view of the portable device with an integrated fingerprint module as shown in FIG. 2 is depicted. Portable device 70 is shown with USB connector 18 protruding from its front end, and fingerprint module 50 is shown as being structurally integrated with portable device 70 in a unitary construction, with sensor 52 disposed on the top side thereof LED 73 is again shown disposed near the edge of the top side of portable device 70.

Figure 6:
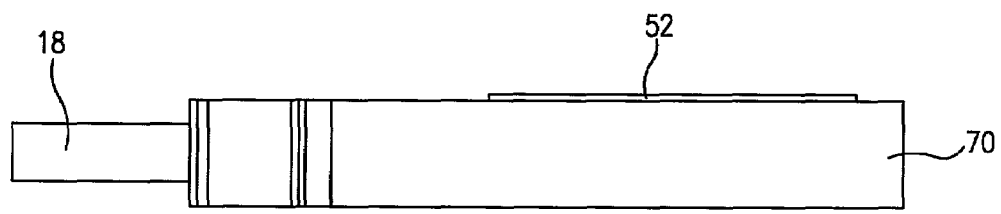
FIG. 6 is a left side elevation view of the portable device with an integrated fingerprint module as shown in FIG. 2.

Reference is now made to FIG. 6, which is a left side elevation view of the portable device with an integrated fingerprint module as shown in FIG. 2. USB connector 18 is shown protruding from the front of portable device 70, and the periphery of sensor 52 is shown slightly raised from the top side of portable device 70.

Figure 7:
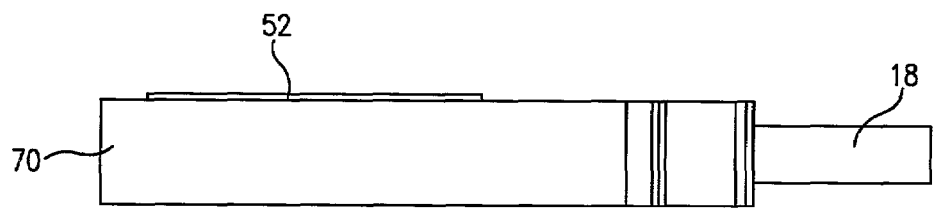
FIG. 7 is a right side elevation view of the portable device with an integrated fingerprint module as shown in FIG. 2.

Next, FIG. 7 is a right side elevation view of the portable device with an integrated fingerprint module as shown in FIG. 2. Once again, USB connector 18 is shown protruding from the front of portable device 70, and the periphery of sensor 52 is shown slightly raised from the top side of portable device 70.

Figure 8:
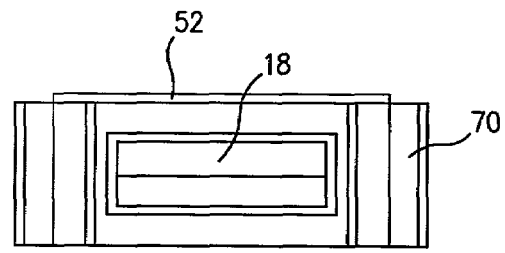
FIG. 8 is a front elevation view of the portable device with an integrated fingerprint module as shown in FIG. 2.

Referring next to FIG. 8, a front elevation view of the portable device with an integrated fingerprint module as shown in FIG. 2 is depicted. The insertion end of USB connector 18 is centrally depicted, and the periphery of sensor 52 is shown slightly raised from the top side of portable device 70.

Figure 9:
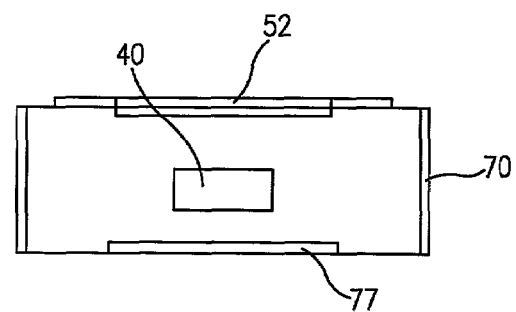
FIG. 9 is a rear elevation view of the portable device with an integrated fingerprint module as shown in FIG. 2.

Reference is now made to FIG. 9, which is a rear elevation view of the portable device with an integrated fingerprint module as shown in FIG. 2. The periphery of sensor 52 is shown slightly raised from the top side of portable device 70, and optional indentation 77 on the bottom side of portable device 70 is also visible. Optional write protection switch 40 is also shown as being located at the rear end of portable device 70.

Figure 10:
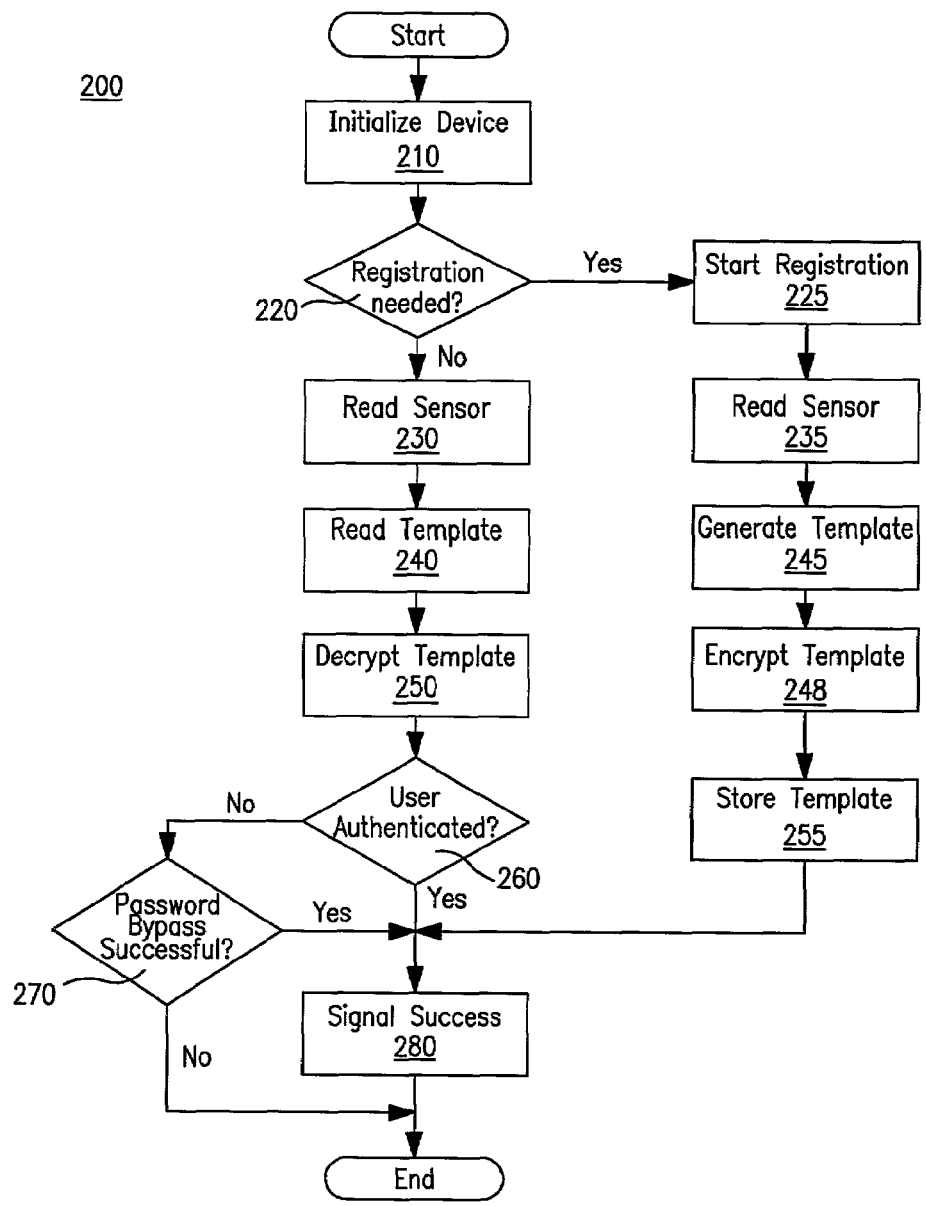
FIG. 10 is a flow diagram illustrating steps of a user registration/authentication process using a portable device in accordance with one embodiment of the present invention.

Referring next to FIG. 10, a flow diagram 200 illustrating steps of a user registration/authentication process using the portable device with an integrated fingerprint module in accordance with one embodiment of the present invention is shown. In the following description, various modules and components referred to have been described above with reference to FIG. 1A using the same reference numerals. In step 210, upon being coupled to a host platform, portable device 70 undergoes an initialization procedure. In a currently preferred embodiment, the initialization procedure involves establishing communication with the host platform and ensuring the host platform is aware that portable device 70 has been coupled thereto.

In step 220, portable device 70 determines whether a user registration is necessary. For example, if portable device 70 is being used for the first time and no template has yet been stored in flash memory 20, portable device 70 will guide the user to complete a registration process (steps 225, 235, 245 and 255 as described below) via a user interface (e.g., pop-up message windows) through the host platform. Thus, upon the first use of portable device 70 (e.g., immediately after purchase), a preferred embodiment automatically initiate the registration process to generate the first ("master") template. This is preferably accomplished by checking a status flag (e.g., flag 121 in flash memory 120 of FIG. 1B). Subsequent registration(s), as described below, can be activated by individual users via software on the host platform.

In one embodiment, portable device 70 supports more than one user. In another embodiment, the same user may register multiple fingerprints as separate templates. In yet another embodiment, the same user fingerprint may be registered multiple times as different templates. Thus, portable device 70 can facilitate the registration of additional user(s) and/or additional template(s) either by periodically (e.g., upon startup) inquiring whether a new user/template needs to be added or upon the user's request in step 220. If an additional user/template is to be registered, the registration process will be invoked. If it is determined that no new registration is necessary, process 200 proceeds with an authentication process (steps 230, 240 and 260 as described below).

It should be appreciated that within the scope of the present invention, software (e.g., a software driver) may need to be installed on the host platform prior to the first use of portable device 70 to enable its utilization of the host platform's user interface to communicate with the user. It should also be appreciated that if the operating system of the host platform has built-in support for such functionality, no additional software needs to be installed thereon.

Referring still to FIG. 10, the registration process is now described. In step 225, the registration process is initiated. In one embodiment, this involves informing the user that a registration process will commence and prompting the user to place his/her finger on sensor 52.

In step 235, sensor 52 is read to capture an image of the fingerprint of the user's finger that has been placed thereon. In a currently preferred embodiment, step 235 also includes verifying that the captured image is of sufficient quality for further processing (e.g., template generation). This is preferably performed by control unit 56 as directed by microprocessor 11. In one embodiment, step 235 will be repeated if the quality of the captured fingerprint image is unacceptable. Under such circumstances, the user will be prompted to place his/her finger on sensor 52 again so that a new image can be captured. Preferably, the number of retry is user-configurable.

Once an acceptable fingerprint image has been captured in step 235, process 200 proceeds to step 245, wherein a template is generated based on the captured fingerprint image. As described above, in a preferred embodiment, the captured image is converted into 64 KB of data, which is then used as input to template generator 12a for generating a 512-byte template.

In step 248, the template generated in step 245 is encrypted. In one embodiment, the encryption is performed by firmware (e.g., encryption firmware 117d of FIG. 1B), thereby providing an added level of security against hacking.

In step 255, the encrypted template is stored into flash memory 20. In one embodiment, upon successful generation and encryption of a template, flash controller 14 is prompted by template generator 12a to store the newly generated and encrypted template into flash memory 20 for use in subsequent user authentication. Moreover, as described above, in a preferred embodiment, the template is stored in a reserved area of flash memory 20 which is specifically designated for storing template(s) and which is not otherwise accessible to the user.

In step 280, a signal or message indicating the successful completion of the registration process is generated. In an embodiment where portable device 70 is used as a secure storage device, step 280 can also entail enabling portable device, i.e., granting the newly registered user access (e.g., read data therefrom and write data thereto) to portable device 70 and mapping portable device 70 to a valid drive letter on host platform 90.

With reference still to FIG. 10, the authentication process is now described. In step 230, sensor 52 is read to capture an image of the fingerprint of the user's finger that has been placed thereon. In a currently preferred embodiment, step 230 also includes a quality check of the captured image by control unit 56, so that the image capture will be repeated if the quality of the captured fingerprint image is unacceptable for template generation. If a repeat capture is needed, the user will be so prompted. Preferably, the number of retry is user-configurable. In a currently preferred embodiment, step 230 also includes generating a template based on the captured fingerprint image and storing the resulting template into volatile memory 16.

In step 240, the stored template(s) are read from flash memory 20 for use as the basis of authenticating the identity of the user whose fingerprint image has been captured in step 230. In a currently preferred embodiment, microprocessor 11 directs flash controller 14 to retrieve the registered template(s) from flash memory 20.

In step 250, the registered template(s) read from flash memory 20, which are stored in encrypted form in a preferred embodiment, are decrypted. The decrypted template(s) are loaded into volatile memory 16 in one embodiment.

In step 260, it is determined whether the user's fingerprint can be authenticated against the registered fingerprint template on record. In a currently preferred embodiment, verification module 12b compares the template pending verification against the registered template(s). If a match is detected, the user is authenticated; otherwise, authentication fails. In one embodiment, the user is allowed to reattempt the authentication process if an initial attempt fails (e.g., steps 230, 240 and 250 are repeated). Preferably, the number of repeated attempts is user-configurable and can be set once an authorized user has been authenticated and granted access.

In one embodiment, when a user has failed to authenticated his/her identity as an authorized user, access to flash memory 20 will be blocked (e.g., in an embodiment where a software driver resides in host platform 90, the software driver can forbid such access). In another embodiment, microprocessor 11 in portable device 70 will shut down or otherwise disable flash controller 14 upon such authentication failure. These actions serve as added security measures against potential hacking and other forms of unauthorized access to the data stored in flash memory 20 and are triggered by repeated failed authentication attempts.

In one embodiment, optional step 270 is provided. In this embodiment, should verification module 12b malfunction and refuse to authenticate an authorized user whose fingerprint has been previously registered, the user is provided with an option to bypass the fingerprint authentication and provide a password to gain access instead. This embodiment affords the user the ability to avoid a helpless situation where access to contents of flash memory 20 cannot be had unless and until verification module 12b is fixed. If the bypass password is correctly entered, user authentication is deemed to be successful; otherwise, user authentication remains a failure. It should also be appreciated that if added security is desired, a password requirement can be implemented in addition to the fingerprint authentication even for normal routine authentication within the scope of the present invention.

In step 280, a signal or message indicating the successful authentication is generated. In an embodiment where portable device 70 is used as a secure storage device, step 280 can also entail enabling portable device, i.e., granting the newly registered user access (e.g., read data therefrom and write data thereto) to portable device 70 and mapping portable device 70 to a valid drive letter on host platform 90.

It should be appreciated that in an embodiment where authentication engine 12 is located in host platform 90, appropriate modifications to the authentication process described above are needed. In particular, once a satisfactory fingerprint image has been obtained in step 230, the image data is first encrypted and then transmitted to host platform 90, wherein the steps to be performed by authentication engine 12 will be carried out. Thus, depending on the particular implementation or application, the information being transmitted from portable device 70 to host platform 90 can either be a simple notification of success upon successful authentication, or image data representing a user fingerprint that is pending authentication.

In a currently preferred embodiment, performance of various steps of process 200 are controlled by microprocessor 11 executing firmware code, which is preferably stored in non-volatile memory 17 of portable device 70.

Significantly, it should be appreciated that the present invention not only contemplates using portable device 70 as a secure data storage device but also as an access control device. In particular, within the scope of the present invention, portable device 70 can act as an "access key" to host platform 90 to which portable device 70 is coupled. More specifically, in one embodiment, in order to access any resource on host platform 90 (e.g., data, files, application programs, peripherals) and/or any resource attached thereto (e.g., network access, network printers and storage devices, electronic mail) a user is required to first successfully authenticate his/her identity as an authorized user using portable device 70 with integrated fingerprint module 50. In accordance with this embodiment, such fingerprint authentication is used preferably in lieu of (or alternatively in addition to) conventional password-based authentication. Thus, the user inconvenience and less stringent security that is inherent in the prior art password-based authentication approach is advantageously eliminated in accordance with the present invention.

Beyond access control to various computer resources, the present invention can also be advantageously utilized in numerous other applications that require security clearance, such as entry into private homes, offices, hotel rooms, bank vaults and security deposit boxes, and so on. The present invention can also be beneficially applied to restrict the operation of machinery, such as factory machines and vehicles, to those who have been properly trained. In one embodiment, access control device 70 can be used as a house key to a private home or room key to a hotel room in place of conventional keys. In the first example, the home owner first registers his/her fingerprint when the biometrics-based lock is installed at the house. In the latter example, a hotel guest first registers his/her fingerprint upon check-in at a hotel. Thereafter, access to the house or hotel room is securely restricted to the respective key holder (home owner or hotel guest). These and other wide-ranging applications of the biometrics-based access device technology disclosed herein are all intended to be within the scope and spirit of the present invention.

Although embodiments of the present invention have been described herein as using fingerprint authentication technology to implement access control, it should be appreciated that the present invention is not limited thereto but rather encompasses the use of other biometrics-based authentication techniques. One such technique is iris scan technology. While such other biometrics-based techniques are not expressly described herein, their applicability to access control implementations using a portable device is within the scope and spirit of the present invention disclosed.

Moreover, while preferred embodiments of the present invention have been described herein as using flash memory as a storage media, it should be appreciated that other types of non-volatile memory, such as ferroelectric random access memory (FRAM) or magnetic random access memory (MRAM), can also be used within the scope of the present invention. In addition, while such preferred embodiments have been described herein as being compatible with the USB standard, the portable device of the present invention is not intended to be restricted thereto. Rather, the present invention is intended to encompass portable devices that support other communication protocols and/or bus standards, such as the IEEE 1394 ("Firewire") standard.

While preferred embodiments of the present invention, a method and system for implementing access control using biometrics-based technology, have been described, it is understood that those skilled in the art, both now and in the future, may make various improvements and enhancements which fall within the scope of the claims that follow. These claims should be construed to maintain the proper protection for the invention first disclosed herein.

What is claimed is:

1. A unitary portable biometrics-based access control device which can be directly plugged into a universal serial bus (USB) socket communicatively coupled to a restricted resource, the device comprising:
   a housing;
   a microprocessor housed within the housing;
   a non-volatile memory coupled to the microprocessor and configured for storing user data and having a minimum of 8 MB of capacity;
   a USB plug integrated into the housing without an intervening cable and configured for coupling the unitary portable access control device directly to the USB socket; and
   a biometrics-based authentication module coupled to and controlled by the microprocessor, at least a portion of the biometrics-based authentication module being housed within the housing, wherein said biometrics-based authentication module is configured to grant access to the restricted resource provided that the biometrics-based authentication module authenticates the user's identity and wherein access to the restricted resource is denied to the user otherwise; and further wherein
   said biometrics-based authentication module is configured to grant access to the user data stored in the non-volatile memory provided that the biometrics-based authentication module authenticates the user's identity and wherein access to the user data stored in the non-volatile memory is denied to the user otherwise,
   wherein the microprocessor is configured to provide a bypass mechanism for authentication upon a determination of authentication failure by the biometrics-based authentication module.

2. A biometrics-based access control system for controlling access to a restricted resource, comprising:
   a portable device which can be directly plugged into a universal serial bus (USB) socket communicatively coupled to the restricted resource and which includes
   a housing;
   a non-volatile memory housed within the housing and having a minimum of 8 MB of capacity;
   a USB plug integrated into the housing without an intervening cable and configured for coupling the portable device directly to the USB socket; and
   a biometrics-based authentication module coupled to the non-volatile memory,
   wherein the biometrics-based authentication module is configured to (1) capture a first biometrics marker, (2) store the first biometrics marker in the non-volatile memory; (3) capture a second biometrics marker; and (4) determine whether the second biometrics marker can be authenticated against the first biometrics marker, and wherein access to the restricted resource is granted upon a determination of successful authentication and wherein access to the restricted resource is denied otherwise,
   wherein a bypass mechanism for authentication is provided upon a determination of authentication failure by the biometrics-based authentication module.

3. A biometrics-based access control method for controlling access to a restricted resource and implemented using a portable device, the method comprising the steps of:
   (a) directly plugging the portable device into a universal serial bus (USB) socket communicatively coupled to the restricted resource, wherein the portable device includes a housing; a memory having a minimum of 8 MB of capacity; a biometrics sensor; and a USB plug integrated into the housing without an intervening cable and configured for coupling the portable device directly to the USB socket:
   (b) obtaining a first biometrics marker from a user with the biometrics sensor of the portable device;
   (c) retrieving a registered biometrics marker from the memory of the portable device, the registered biometrics marker having been stored therein during a registration process;
   (d) comparing the first biometrics marker against the registered biometrics marker; and
   (e) granting the user access to the restricted resource provided that a match is identified in said step (d), and
   providing the user with a bypass authentication procedure provided that a match is not identified in said step (d).

* * * * *